Patented Nov. 1, 1932

1,886,334

UNITED STATES PATENT OFFICE

LEONARD GOWEN GABRIEL AND JOHN FREDERICK BLOTT, OF LONDON, ENGLAND, ASSIGNORS, BY MESNE ASSIGNMENTS, TO COLAS ROADS INC., OF BOSTON, MASSACHUSETTS, A CORPORATION OF MASSACHUSETTS

EMULSION CONTAINING INDIA RUBBER

No Drawing. Application filed February 18, 1930, Serial No. 429,457, and in Great Britain February 27, 1929.

This invention comprises improvements in or relating to emulsions containing india rubber. The invention is applicable to emulsions in general and one example of its application is to emulsions of bitumen-in-water.

We have discovered that rubber latex is a good emulsifier capable of promoting dispersion of liquid or solid particles in a liquid medium. Accordingly this invention, broadly stated, provides a process of emulsification which is characterized by the employment of rubber latex in suitable proportion as the emulsifying agent.

The process according to the invention may consist in subjecting to agitation in a mixer, a material to be dispersed (e. g. molten or liquid bituminous material, raw or boiled linseed oil, rosin oils or turpentine) and rubber latex, emulsification being effected without the addition of soap, fatty acid or other of the usual dispersing agents. The mixing process is preferably carried out in a colloid mill, for example of the rotating disc type provided with adjustable clearances.

In one form the invention is applied to the formation of an aqueous emulsion of bitumen of the type artificially prepared from petroleum, and according to a feature of the invention the proportion of latex is such as to introduce about 25% rubber reckoned by weight of the emulsion.

It has hitherto been proposed, in British Patent No. 254,004, to incorporate india rubber in an aqueous emulsion of bitumen, the rubber being added, for example in the form of latex, to the usual constituents of the emulsion while undergoing emulsification. According to British Patent No. 254,004 molten bitumen is emulsified by adding to it, in a mixer, a proportion (8–10% reckoned by weight on the bitumen) of fatty acid, casein or the like and thereafter effecting within the body of the bitumen a saponification or equivalent reaction by the addition to the contents of the mixer of a dilute solution of caustic soda or other alkali.

The process according to the present invention is distinguished from that described in British Patent No. 254,004 in that in the present case emulsification is effected solely by the addition of rubber latex, and the use of emulsifiers such as fatty acid or the like is rendered unnecessary.

Two examples according to the invention will now be described.

Example I 300 grams of rubber latex, having a 33⅓% rubber content were run into a colloid mill together with 100 grams of molten bitumen (200° penetration) of the type artificially produced from petroleum. The temperature of the latex was 50° C. and that of the bitumen was 130° C. A stable emulsion of bitumen was formed containing 25% rubber and 25% bitumen, the remaining 50% comprising substantially the aqueous content of the latex, used as the emulsifying agent.

Example II

At room temperature 100 grams of raw linseed oil were run through a colloid mill together with 300 grams of rubber latex containing approximately 33% of rubber. A stable emulsion was produced.

In carrying out the invention on the lines of the above examples we consider it essential to use a colloid mill in order to obtain a satisfactory dispersion.

It is to be noted that the emulsions produced according to the above examples can be coagulated by any of the well known methods employed for the coagulation of latex. For instance the emulsion produced in Example II may be coagulated to yield a mass with rubber-like properties which is capable of being vulcanized to give a substance which also possesses elastic properties.

It is within this invention to incorporate in the finished emulsion a small portion of a stabilizing reagent. In one example alkali caseinate was employed for this purpose and was incorporated in the form of a 2% solution, using the rubber latex as the solvent. It will be understood that the alkali caseinate or other stabilizer takes no part in the formation of the emulsion, being introduced only after emulsification has actually been effected, in order to impart to the emulsion the desired additional degree of stability.

Having thus described an embodiment of our invention, it will be obvious that numerous changes or modifications may be made therein without departing from the scope of the invention as defined in the appended claims.

We claim as our invention:

1. A process for the manufacture of an aqueous bituminous emulsion containing india rubber, which consists in subjecting to agitation in a colloid mill a mixture of molten bituminous material and rubber latex, emulsification being effected without the addition of soap or other of the usual dispersing agents.

2. An emulsification process according to claim 1, wherein the proportion of latex is such, as to provide in the region of 25% rubber in the finished emulsion, reckoned by weight.

3. A process according to claim 1 wherein, after emulsification has been effected, a small proportion of a stabilizing reagent is added to the emulsion.

In testimony whereof we have signed our names to this specification.

LEONARD GOWEN GABRIEL.
JOHN FREDERICK BLOTT.